Feb. 13, 1940. S. E. ROGERS ET AL 2,190,523
ELECTRIC VALVE CONVERTING SYSTEM
Filed Aug. 17, 1938
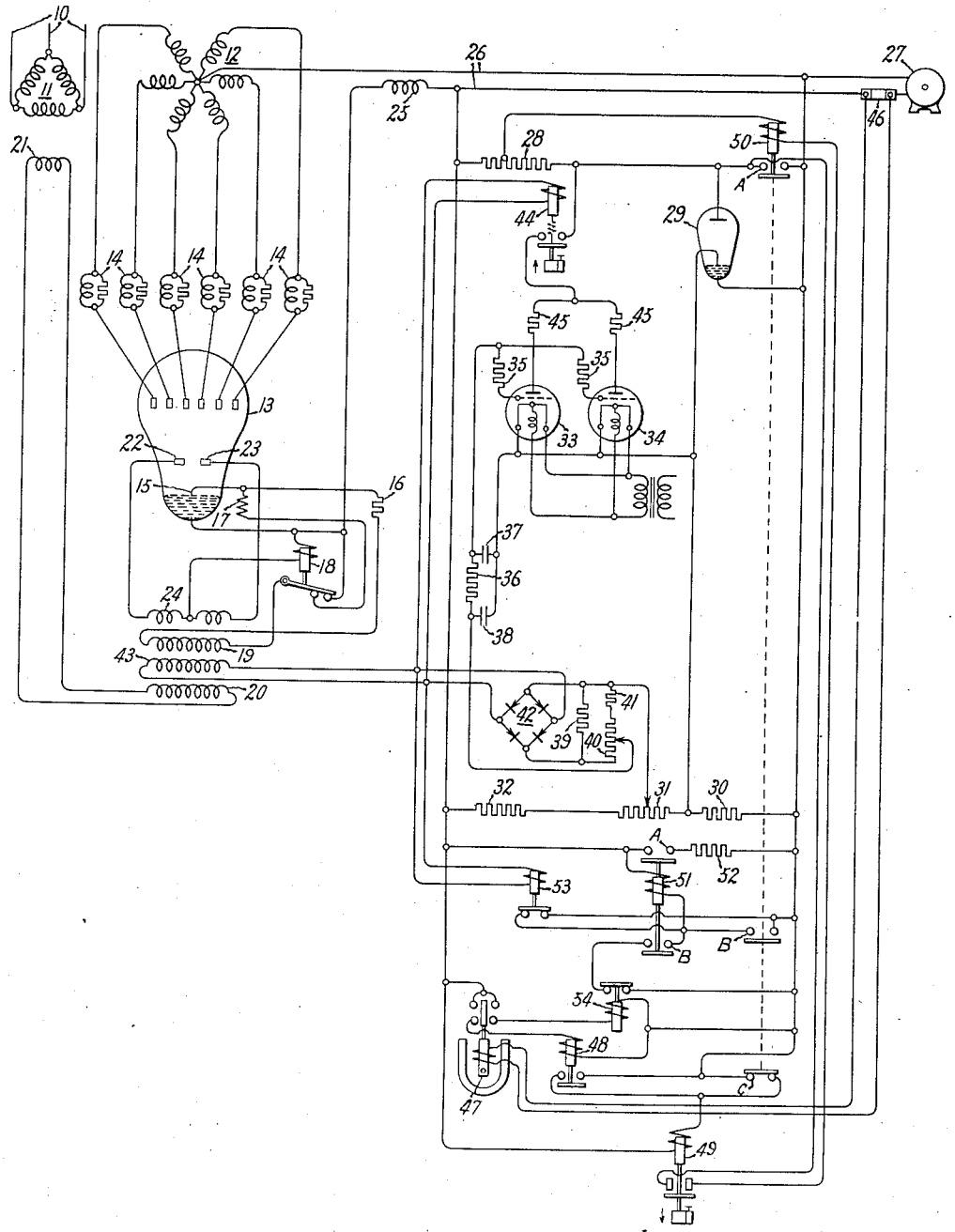
Inventors:
Stephen E. Rogers,
Austyn L. Whiteley,
by Harry E. Dunham
Their Attorney.

Patented Feb. 13, 1940

2,190,523

UNITED STATES PATENT OFFICE 2,190,523

ELECTRIC VALVE CONVERTING SYSTEM

Stephen E. Rogers and Austyn L. Whiteley, Rugby, England, assignors to General Electric Company, a corporation of New York Application August 17, 1938, Serial No. 225,468
In Great Britain August 18, 1937

7 Claims. (Cl. 172—179)

Our invention relates to electric valve converting systems and more particularly to control systems for electric valve rectifiers supplying energy to a dynamic load circuit.

It has been suggested heretofore that where electric valve rectifiers were supplying energy to a dynamic load that a loading resistor be connected across the direct current load circuit during the time that the dynamic load is producing a condition of regeneration. Such schemes generally have been inadequate since they fail to take care of all practical operating conditions and the time consumed in connecting the resistors to the direct current load circuit was too great.

It is an object of our invention, therefore, to provide an improved electric valve rectifying system and control therefor for operation with a dynamic load circuit which will overcome the above-mentioned disadvantages of the arrangement of the prior art, and which will be simple and reliable in operation.

Another object of our invention is to provide an improved control circuit for an electric valve rectifier supplying energy to a dynamic load circuit which will rapidly respond to the condition of regeneration.

Still another object of our invention is to provide an improved control circuit for an electric valve rectifier supplying energy to a dynamic load which will respond to a condition of regeneration and to a predetermined relation between the alternating current supply voltage of the rectifier and the direct current load circuit voltage.

In accordance with our invention we provide a load resistance or impedance which is connected across the direct current load circuit during the time when the regenerative condition occurs and which load resistor is connected by means of an electric valve which is rendered conductive responsive to a regenerative condition, and to a predetermined relation between the alternating current supply circuit voltage of the rectifier and the direct current dynamic load circuit voltage.

The novel features which we believe to be characteristic of our invention are set forth with particularity in the appended claims. Our invention itself, however, both as to its organization and method of operation together with further objects and advantages thereof, will be better understood by reference to the following description taken in connection with the accompanying drawing in which the figure represents an electric valve rectifier supplying a dynamic load and which embodies the features of our invention.

Referring to the figure of the drawing, we have illustrated therein an alternating current supply circuit 10 connected to the primary winding 11 of a transformer the secondary winding 12 of which is arranged to supply energy to the various anodes of an electric valve discharge device 13. The electric valve discharge device 13 may be any of the types commonly known and used in the art although it is preferable to utilize electric valves of the type having an anode, a cathode and an ionizable medium enclosed within an envelope. Obviously, of course, in place of utilizing a multi-anode, single cathode discharge device, a plurality of individual electric discharge devices may be utilized with a common cathode connection. In the arrangement illustrated the electric valve discharge device 13 is provided with a plurality of anodes each of which is connected through a suitable reactor and resistor arrangement 14 to respective outer terminals of the secondary winding 12 of the input transformer. The electric discharge device 13 is furthermore provided with a cathode of the mercury pool type which is started by the means of an igniter 15 which is connected in a starting circuit including a resistor 16, an actuating coil 17, relay contact 18, and a transformer winding 19, the primary winding 20 of which is connected to be energized from a tertiary winding 21 arranged upon the same core structure as the primary winding 11 which is connected to the alternating current supply circuit 10. A pair of holding anodes 22 and 23 are energized from a transformer winding 24 arranged on the same transformer core structure as the windings 19 and 20. The midpoint of the transformer winding 24 is connected through the actuating coil of the relay 18 to the cathode of the electric discharge device 13. The cathode of the electric discharge device 13 is connected through a suitable reactor 25 to one side of the direct current load circuit 26 the other side of which is connected to the neutral point of the transformer winding 12. The direct curernt load circuit 26 supplies a dynamic load which may be represented by the motor 27.

A control circuit is connected across the direct current circuit 26 and this includes the main loading resistor 28 which is connected in series with an electric valve 29 which may be of the igniter type as shown, or any of the types commonly known in the art which are provided with a control electrode. The valve 29 is rendered conductive in accordance with a predetermined electrical condition comprising a certain ratio between the alternating current voltage of the supply circuit 10 and the direct current voltage of the load circuit 26. This ratio is obtained by connecting a plurality of resistors 30 to 32 across the direct current circuit and utilizing a portion of the potential appearing across these resistors in the control circuits of a pair of electric valves 33 and 34. The control circuits of the valves 33 and 34 therefore include suitable current limiting resistors such as 35 and a resistor 36 by-passed by suitable capacitors 37 and 38. The cathodes of the valves 33 and 34 are connected to a point between the resistors 30 and 31. The resistor 31 is provided with an adjustable contact so that the voltage appearing thereacross is impressed upon a resistor network comprising the resistors 39 to 41. An adjusting contact on the resistor 40 is connected to one terminal of the resistor 36. The resistor network comprising resistors 39 to 41 is also supplied with a direct current potential obtained from a bridge rectifier 42 which is energized by alternating current obtained from the transformer winding 43 which is on the same core structure as the transformer windings 19, 20 and 24. This transformer thus supplies alternating potential which is proportional to the voltage of the alternating potential appearing in the alternating current supply circuit 10. The control voltage of the valves 33 and 34 thus is proportional to the voltage of the direct current circuit 26 and a direct current voltage which is proportional to the alternating current supply circuit 10. Whenever this predetermined relation differs, from an amount selected for normal operation the valves 33 and 34 are rendered conductive thus causing the electric valve 29 to become conductive and connect the resistor 28 across the direct current circuit 26. Since the transformer winding 20 supplies energy to a transformer which controls the starting of the electric valve 13 energy is taken from one of the windings 43 to energize a time delay relay 44 the contacts of which are connected in series between the anodes of the valves 33 and 34 and the anode of the valve 29. If desired, suitable current limiting resistors such as 45 may also be connected in the anode circuits of the control valves 33 and 34. Thus during the starting operation of the valve 13 the control circuit is maintained inoperative for a predetermined time which corresponds to the time constant of the time delay relay 44. A shunt 46 connected in one side of the direct current circuit 26 supplies energy to the actuating coil of a polarized relay 47 which controls the energization of a relay 48 the contacts of which are in circuit with a relay 49. A relay 50 provided with three sets of contacts A, B and C, has a coil which is energized from across a portion of the loading resistor 28 and this relay is in turn controlled by the contacts of relay 49. Thus, when the electric valve 29 has been rendered conductive so as to place the loading resistor 28 across the direct current circuit 26 the relay 50 will operate since the contacts of relay 49 have been closed due to the condition of regeneration appearing across the direct current circuit and thus the contact A of the relay 50 short circuits the electric valve 29 thereby rendering it non-conductive yet maintaining the resistor 28 across the direct current circuit. The relay 50, by means of the contact C, opens up one of a pair of parallel contacts which control the relay 49, and by means of the relay contact B closes a circuit controlling the coil of the relay 51 which is provided with two sets of contacts A and B, contact A controlling the connection of a no-load resistor 52 across the direct current circuit. The coil of the relay 51 is controlled by three sets of contacts, contacts 51B, contact 50B and the contacts of a relay 53. The relay 53 has its coil connected across an alternating current source obtained from the transformer winding 43 so that whenever the electric valve 13 is initially energized the no-loading resistor 52 will become disconnected from the direct current circuit 56. The contacts B of the relay 51 are connected in series with the normally closed contacts of a relay 54, the actuating coil of which is controlled by the contacts of the polarized relay 47.

The function and operation of the various relays of the control circuit can best perhaps be understood by reference to the following sequence of operation. If it is assumed that the voltage appearing across the direct current circuit 26 rises due to a regenerative condition of the dynamic load circuit, there will be a change from the predetermined voltage relation between the alternating current supply circuit and the direct current load circuit which will cause a direct current potential to appear in the control circuit of the electric valves 33 and 34 which will cause the igniter valve 29 to be rendered conductive thereby connecting the loading resistor across the direct current circuit 26. Since the flow of current due to regeneration in the direct current circuit 26 tends to reverse, the polarized relay 47 will also be actuated thus eenrgizing the relay 48 and causing the relay 49 to close its contacts. The connection of the resistor 28 across the direct current circuit thus energizes the relay 50 which closes its three sets of contacts A, B and C, the first set of contacts A short circuiting the valve 29 while yet maintaining the resistor 28 across the load circuit. The closing of the contacts B causes the relay 51 to be energized which relay locks itself into position by closing its contacts B, and the contacts A thereof connect the no-load resistor 52 across the direct current circuit. The relay 49 is a time delay relay arranged to open its contacts after a predetermined time so as soon as the regenerative condition in the direct current circuit 26 ceases to exist the relay 47 will open its contacts controlling the relay 48 with the result that the coil of the relay 49 is deenergized, thus permitting the contacts to open after a predetermined time. If, however, at this time the relay 47 still detects a reverse current due to regeneration, the relay 48 will not open until the regenerative current is zero thus delaying the deenergization of the coil of the relay 49. After the contacts of the relay 49 are opened the relay 50 is deenergized thus opening its series of contacts A and B and closing the contact C. When the regenerative condition of the direct current circuit 26 ceases to exist the actuating coil of the relay 51 is subject to control by the contacts of the relay 54. As normal current begins to flow in the direct current circuit due to the supplying of direct current energy to the load circuit the relay 47 which is of the polarized type will eventually close the contacts which control the actuating coil of the relay 54. When this occurs the relay coil 51 will become deenergized thus disconnecting the no-load resistor from the direct current circuit. The relay 47 is therefore so designed as to operate to close the contacts of the actuating coil of the relay 54 only after a predetermined value of current has been flowing in the direct current circuit 26.

From this description of the sequence of operation it is therefore apparent that the relay 47 comprises a means for detecting reverse current flow in the direct current circuit and that the relay 48 detects the cessation of reverse current flow in the direct current circuit. The relay 50 therefore comprises a means for short circuiting the igniter valve 29 thereby rendering it nonconductive yet maintaining the resistor 28 connected to the direct current circuit and also for initiating a sequence of operation which connects the second or no-load resistor 52 across the direct current circuit. Relay 49 operates to remove the main loading resistor upon cessation of reverse current flow in the direct current circuit after a predetermined delay. Relay 54 is a means responsive to a predetermined normal flow of direct current, and relay 54 together with relay 47 comprises a means responsive to a predetermined normal flow of direct current in the load circuit for disconnecting the no-load resistor 52.

While we have shown a particular application of our invention to an electric valve rectifying apparatus, it is to be understood that this is merely illustrative as one of a number of electric valve rectifying apparatus to which our invention may be applied. Furthermore, the control circuit may employ other means to produce the functions thereof.

While we have shown and described our invention in connection with a certain specific embodiment, it will of course be understood that we do not wish to be limited thereto, since it is apparent that the principles herein disclosed are susceptible of numerous other applications, and modifications may be made in the circuit arrangement and the instrumentalities employed to which our invention may be applied without departing from the spirit and scope of our invention as set forth in the appended claims.

What we claim as new and desire to secure by Letters Patent of the United States is:

1. The combination of a source of direct current, a load circuit including a regenerative load, a pair of loading devices arranged to be connected across said load circuit, means responsive to a reversal of flow of current in said load circuit for connecting said devices across said circuit, means responsive to a cessation of said reverse flow of current for disconnecting one of said devices, and means responsive to a predetermined normal flow of current for disconnecting the other of said devices.

2. The combination of an electric valve rectifier energized from a source of alternating current, a load circuit connected to said rectifier and including a regenerative load, a pair of loading resistors, means responsive to a predetermined relation between the potentials of said source and said load and to a reversal of flow of current in said load circuit for connecting said resistors across said circuit, means responsive to a cessation of said reverse flow of current for disconnecting one of said resistors, and means responsive to a predetermined normal flow of current for disconnecting the other of said resistors.

3. The combination of an electric valve rectifier energized from a source of alternating current, a load circuit connected to said rectifier and including a regenerative load, a load impedance, electric valve means responsive to a predetermined electrical condition of said rectifier for connecting said impedance across said load circuit, a second load impedance, means responsive to the operation of said valve means for connecting said second impedance to said load circuit, means for detecting a cessation of said electrical condition, means responsive to said latter means for disconnecting said first impedance after a predetermined time interval, and means responsive to a predetermined normal flow of current in said load circuit for disconnecting the other of said impedances.

4. The combination comprising an electric valve rectifier energized from a source of alternating potential, a load circuit connected to said rectifier and including a regenerative load, a plurality of loading devices, means responsive to a predetermined electrical condition of said rectifier for connecting said devices across said circuit, means for detecting a cessation of said electrical condition, means responsive to said latter means for disconnecting certain of said devices after a predetermined time interval, and means responsive to a predetermined value of current flowing in said load circuit for disconnecting the remainder of said loading devices.

5. The combination of an electric valve rectifier energized from a source of current, a load circuit energized by said rectifier and including a regenerative load, a plurality of load devices, means including an electric valve for connecting said load devices to said load circuit in response to a regenerative load condition, means for short circuiting said valve means, means for detecting a cessation of said regenerative condition, time delay relay means responsive to said latter means for rendering ineffective said short circuiting means thereby disconnecting certain of said load devices, and relay means responsive to a predetermined value of non-regenerative current flow in said load circuit for disconnecting the remaining load devices.

6. The combination comprising a source of alternating current, a direct current load circuit including a regenerative load, rectifying means interconnecting said source and said load circuit, a loading resistor connected in series with an electric valve across said load circuit, means responsive to a predetermined relation between the voltage of said source and the voltage of said load circuit for rendering conductive said valve, a second loading resistor, means responsive to the conductivity of said valve and to a reversal of the direction of flow of current in said load circuit for connecting said second resistor across said load circuit, means for removing said first load resistor from said load circuit after a predetermined time after the cessation of reverse current flow in said load circuit, and means responsive to a predetermined value of normal flow of current in said load circuit for removing said second load resistor from said load circuit.

7. In combination, a source of direct current, a load circuit connected thereto and including a regenerative load, a loading device arranged to be connected across said load circuit, means responsive to a reversal of current flow in said load circuit for connecting said device across said circuit, and means responsive to a cessation of said reverse flow of current for disconnecting said device.

STEPHEN E. ROGERS.
AUSTYN L. WHITELEY.